US005670469A

United States Patent [19]

[11] Patent Number: 5,670,469

[45] Date of Patent: Sep. 23, 1997

Dingus et al.

[54] METHODS AND COMPOSITIONS FOR CLEANING AND DECONTAMINATION

[75] Inventors: Michael L. Dingus; Walter P. Zoch; Thomas R. Mayfield; Alan Bray; Rock A. Rushing, all of Austin, Tex.

[73] Assignee: Texas Research Institute, Austin, Tex.

[21] Appl. No.: 369,548

[22] Filed: Jan. 6, 1995

[51] Int. Cl.$^6$ .......................... C09K 11/06; G01N 31/00; C11D 1/00

[52] U.S. Cl. .......................... 510/274; 510/365; 510/406; 510/413; 510/414; 510/419; 510/421; 510/426; 510/245; 252/301.19; 252/408.1; 106/20; 106/26 R; 106/32

[58] Field of Search ......................... 252/174.23, 174.21, 252/170, 162, 551, 174.17, 301.19, 408.1; 8/403; 106/26 R, 20, 32; 510/274, 365, 406–426, 301.19, 408.1

[56] References Cited

U.S. PATENT DOCUMENTS

| | | | |
|---|---|---|---|
| 3,355,392 | 11/1967 | Cantor et al. | 252/99 |
| 3,650,831 | 3/1972 | Jungerman et al. | 134/27 |
| 3,663,262 | 5/1972 | Cogan, Jr. | 117/62.1 |
| 3,929,406 | 12/1975 | Farmer et al. | 8/164 |
| 3,951,598 | 4/1976 | Arashi et al. | 8/169 |

(List continued on next page.)

OTHER PUBLICATIONS

Peterson, D.F., "Evaluating the Effectiveness of Haz–Mat Decontamination", *Fire Engineering*, pp. 74–78, Apr., 1994.

Mansdorf, S.Z., "Personal Protective Equipment Decontamination for Hazardous Waste Operations and Emergency Response", in: *Performance of Protective Clothing*: Fourth vol., ASTM STP 1133, James P. McBriarty and Norman W. Henry, Eds., American Society for Testing and Materials, Philadelphia, pp. 849–854, no month available 1992.

(List continued on next page.)

*Primary Examiner*—Margaret Einsmann
*Attorney, Agent, or Firm*—Denise L. Mayfield

[57] ABSTRACT

Improved compositions containing a visible coloring agent, such as a pigment or dye, together with a polymer or hydroxylated aliphate alcohol, and an active ingredient defined as a surfactant, a therapeutic agent or biocide, are disclosed. The detectable agent is readily visible under normal white light, and provides a technique for monitoring disturbed and undisturbed areas on a surface. Such is useful in the described methods for cleaning and/or decontaminating a surface, such as in the decontamination of equipment and clothing used during hazardous spill response. The compositions are adherent to a variety of different materials, including Teflon®. This makes the preparations particularly useful in the cleaning and decontamination of non-flat and curved surfaces, such as on protective garments. The compositions in particular embodiments include a visually detectable coloring agent (such as a colored pigment), a surfactant (such as ethoxylate alcohol), an emulsifier (such as carboxymethyl cellulose), an extender (such as PEG), and a solvent (such as d-limonene). These compositions may also include water or other suitable diluent.

16 Claims, 1 Drawing Sheet

U.S. PATENT DOCUMENTS

| | | | |
|---|---|---|---|
| 4,070,510 | 1/1978 | Kahn | 427/385 R |
| 4,071,645 | 1/1978 | Kahn | 427/340 |
| 4,420,412 | 12/1983 | Wong | 252/186.38 |
| 4,499,001 | 2/1985 | Eoga | 252/99 |
| 4,678,658 | 7/1987 | Casey et al. | 424/7.1 |
| 4,793,988 | 12/1988 | Casey et al. | 424/7.1 |
| 4,965,063 | 10/1990 | Casey et al. | 424/7.1 |
| 5,057,303 | 10/1991 | Casey | 424/7.1 |
| 5,064,635 | 11/1991 | Casey | 424/7.1 |
| 5,092,907 | 3/1992 | Riblet et al. | 8/645 |
| 5,109,127 | 4/1992 | Sekiguchi et al. | 536/115 |
| 5,110,492 | 5/1992 | Casey | 252/90 |
| 5,213,624 | 5/1993 | Williams | 134/40 |
| 5,421,897 | 6/1995 | Grawe | 134/6 |

OTHER PUBLICATIONS

"Standard Operating Safety Guides", Environmental Response Branch, Hazardous Response Support Division, Office of Emergency and Remedial Response, U.S. Environmental Protection Agency, pp. I–1 to III–35, Nov., no month available 1984.

"Haz–Mat Protective Clothing Decontamination Cleaner for Cleaning Haz–Mat Suites"™, an advertising brochure distributed by Winsol Laboratories, Inc., no month available 1994.

"IDO Disinfectant"™, Cleaner Disinfectant Sanitizer, Winsol Laboratories, Inc. no month available 1992.

"Versitol", Concentrated Detergent for Turnout Gear, Winsol Laboratories, Inc., Technical Bulletin, date unknown.

Yang, et al., "Decontamination of Chemical Warfare Agents", Abstract only, Edgewood Research Development and Engineering Center Aberdeen Proving Ground, MD, Dec., 1992.

Hovanec, et al., "Evaluation of Standard and Alternative Methods for the Decontamination of VX and HD in Chemical Agent Disposal Facilities", Abstract only, Edgewood Research Development and Engineering Center Aberdeen Proving Ground, MD, Apr., 1993.

Clewley, et al., "The Effect of 2–Methyl–substituted Nitroimidazoles on the Hydrolysis of 4–Nitrophenyl Esters", Defense Research Establishment, Suffield Ralston (Alberta), Mar., 1994.

NFPA 1581 Standard on Fire Department Infection Control Program, 1991 Edition, pp. 1–3, 5–17, 1991.

METHODS AND COMPOSITIONS FOR CLEANING AND DECONTAMINATION

This invention was made with government support under DAAH04-93-C-0012 awarded by the U.S. Army, Army Research Laboratory. The government has certain rights in the invention.

BACKGROUND OF THE INVENTION

1. Field of the Invention

The invention in general relates to the field of cleaning and decontamination products and methods. More particularly, the invention relates to methods of increasing washing effectiveness, decontamination, cleaning, or disinfection of personal protective clothing, personnel, and equipment.

2. Description of the Related Art

The release of hazardous and potentially toxic substances is a problem that requires prompt and effective treatment. Methods for handling release of such materials have been developed by the Environmental Protection Agency, (EPO Handbook, "The Standard Operating Safety Guidelines" (1984)). This handbook, and regulations promulgated by the Environmental Protection Agency's Occupational Health and Safety Manual (Chapter 9, Hazardous Substances Responses (1440 TN 12) (May 5, 1984)), also describe precautionary measures currently employed focussed at minimizing contamination to the environment and personnel involved in hazardous material cleanup and disposal.

Personal protective clothing, equipment, sampling tools and other items are also exposed to contaminating materials during clean-up and first responder situations. Garments that require cleaning in such applications include total encapsulating vapor protective suits as well as other equipment and protective coverings. These items must be cleaned and/or decontaminated as thoroughly as possible to minimize cross-contamination, and, in some cases, to prepare them for reuse. The cleaning and/or decontamination procedure should also be completed as quickly as possible. This is because workers in contaminated areas typically wear Self Contained Breathing Apparatus (SCBA) equipment. As such, the wearer is frequently low on air, thus requiring that personnel be removed from the suit as soon after the hazardous task has been completed as possible.

Currently proposed techniques for removing contaminants from a surface may be classified as either physical or chemical. An example of a simple physical technique involves a detergent having an anionic surface active agent. One such detergent is characterized as having a boiling point of 212° F. and a freezing point of 32° F. This detergent is non-adherent. Therefore, areas that have been washed with the detergent in the cleaning/decontamination process are not easily detectable. For water soluble substances, the cleaning procedure may simply amount to a detergent and water wash. For acids and bases, neutralization employs a weak water-based solution of the opposing acid or base (e.g., vinegar and baking soda). Some acids, such as hydrofluoric acid, may need to be complexed as well as neutralized, in the decontamination process. Unlike the nuclear industry, use of solvents such as Freon® or methylene chloride has not been shown to be effective in the cleaning of organic substances, and may actually degrade or permeate the surface of a piece of equipment. One approach for cleaning volatile organics, as well as chemical warfare agents, is hot air washing. For this approach, the protective equipment is placed in a room or chamber and bathed in 120° to 250° F. dry air. The washed air is then exhausted through filter banks of activated charcoal. Air washing appears to require approximately 24 to 48 hours to be effective, depending on the type and extent of contamination.

The effective cleaning of highly porous materials also continues to be a problem in the industry, as they are not easily decontaminated in a cost effective manner using available techniques. Consequently, contaminated equipment and materials with porous surfaces are many times simply discarded.

Other products used to clean and/or decontaminate surfaces include an iodine-containing disinfectant (e.g., I D O disinfectant (WINSOL LABORATORIES, Seattle, Wash.)). This product is relatively non-adherent, and therefore does not provide a visible means for easily monitoring surfaces that have or have not been cleaned.

For use in decontamination procedures, currently available materials and techniques fail to indicate areas that have been treated and/or cleaned. Risk of human exposure to potentially hazardous substances thus exists even after conventional cleaning and decontamination procedures are carried out. Surfactant-water solutions typically used in cleaning and decontamination applications have poor wetting characteristics, especially when the surface being tested is constructed of polyolefins and/or Teflon® analogs. Additionally, currently used detergent and water preparations frequently contain foam enhances, thus potentially causing problems with disposal and destruction of contaminated suds. Soap foams may also mask areas that have not yet been cleaned.

A cleaning product is needed that will clean easily and rapidly, and that provides an indication of areas that are missed in the cleaning process without the use of ancillary pieces of equipment. In response to growing demands for "green" (i.e., biocompatible) cleaning agents and processes, a need also exists for a cleaning agent that is not in itself a biohazard.

It is an object of the invention to provide improved methods for cleaning and/or decontaminating surfaces. More specifically, it is an object of the invention to provide a method of cleaning that employs a cleaning agent having a visually detectable coloring agent and a surfactant, where removal of the visually detectable coloring agent defines areas where the intended scrubbing or cleaning process has been performed. It is also an object of the invention to provide materials and methods useful in teaching decontamination/cleaning procedures. Such may be accomplished with an adherent decontamination/cleaning agent that includes a visually detectable coloring agent.

An additional object of the invention is to provide a technique for detecting punctures or breaches of a protective barrier. Such would be particularly useful in specific exposure conditions where it is necessary to determine the integrity of a protective garment after exposure or a suspected exposure to a hazardous material. The result of this inspection may dictate secondary decontamination of the wearer, and therefore may serve the additional object of monitoring worker risk of exposure to hazardous materials.

It is a further object of the invention to provide an improved cleaning and/or decontaminating composition having enhanced adherent characteristics. It is still another object of the invention to provide a method to evaluate and compare decontamination procedure effectiveness with the unaided eye, i.e., a method that may be used under normal white light.

SUMMARY OF THE INVENTION

The present invention satisfies at least one of the above and other useful objectives. Both compositions and methods of employing said compositions in a variety of applications, and particularly, as an aid in methods for cleaning and/or decontaminating a surface, are disclosed. The unique characteristics of the compositions include the presence of a visually detectable coloring agent and its ability to adhere to many different types of surfaces, including Teflon®.

The disclosed compositions, with the visually detectable coloring agents, particularly dyes and pigments, may also include a variety of active ingredients, including but not limited to surfactants, therapeutic agents, biocides, or a combination of all or some of these.

Where a surfactant is at least one of the active ingredients included, a uniquely efficacious cleaning formulation is created that gives the user an easily and readily detectable reference in cleaning and/or decontaminating a given surface. A variety of different surfactants may be employed singularly in or combination in the compositions. By way of example and not limitation, such surfactants include ethoxylate alcohol (sulfated), sulfonates, alkyl sulfates, sulfosuccinates, alcanolamides, fatty acid esters, ethoxylated triglycerides, cocamido propyl betaines, imidosolines, ethoxylated fatty amines, and the like. In particular embodiments, the surfactant is a sulfated ethoxylate alcohol, such as Witcolate™.

In some embodiments, the composition also includes a polymer, a hydroxylated aliphatic alcohol, or mixtures thereof. By way of example and not limitation, such polymers include polyethylene glycol, polypropylene glycol, glycol ethers, N-methyl pydrolidinone, or any other water soluble polymer that is liquid at room temperature. Examples of hydroxylated aliphatic alcohols that may be included with the composition include glycerol, ethylene glycol, butane diol, hexane diol, hexane triol, and the like.

In some embodiments, the composition also includes a solvent and an emulsifier. By way of example, the solvent may comprise limonene, and particularly d-limonene. Other solvents, such as aliphatic-aromatic hydrocarbons, alcohols, esters, ketones, aldehydes, amides, glycols, glycol esters, lactones, pyrolidones, carboxylic acids, as well as halogenated derivatives thereof, may be used in the compositions of the invention alone or in combination.

In some embodiments, the emulsifier may comprise a polymer. The polymer may be either water soluble or water insoluble. By way of example and not limitation, these water soluble polymers include carboxymethyl cellulose, plant gum, polyvinyl pyrrolidone, polyvinyl alcohol, polyethylene oxide, alginates, pectin, gelatin, polyacrylamide, polyacrylic acid, polyethylene glycol, polypropylene glycol, starches, or analogs as well as derivatives thereof. One embodiment of the composition includes the water soluble polymer, sodium carboxymethyl cellulose as the emulsifier.

Other embodiments of the invention may further include an extender. By way of example, such extenders may comprise polyethylene glycol (PEG), polypropylene glycol, glycol ethers, n-methyl pyrolidinone, or mixtures thereof. Other extenders, and more specifically other polymers, may also be used in the composition either alone or in combination with other extenders.

The visually detectable coloring agent of the invention may comprise a synthetic pigment, an organic or inorganic pigment, a plant-based pigment, a dye, as well as mixtures of these agents. In some embodiments of the invention, the visually detectable coloring agents are pigments. Such pigments, by way of example, may be fluorescent (such as T-15 Blaze Orange™). These, and other fluorescent pigments, are available in a variety of colors, including white, and may be used in various embodiments of the composition. Both fluorescent and non-fluorescent pigments may be used in the practice of the present invention, and will provide the adherent, readily visible and detectable preparation disclosed.

The compositions of the present invention may further comprise water or some other suitable liquid diluent or carrier. By way of example, this diluent may comprise from about 0.1%/wt to about 99%/wt of the composition. In some embodiments, water constituting about 90% to about 95%/wt of the composition.

In one embodiment, the composition comprises from about 1% to about 90%/weight surfactant, about 0.1% to about 90%/weight solvent, about 1% to about 80%/weight emulsifier, about 0.1% to about 90%/weight visually detectable coloring agent, and about 20% to about 95%/weight polymer. In even further defined embodiments, the composition comprises about 5% to about 25% surfactant, about 2% to about 25% solvent, about 2% to about 25% emulsifier, and about 2% to about 25% visually detectable coloring agent, and about 30% to about 70%/weight polymer.

An even further embodiment of the composition comprises about 18% to about 22% surfactant, about 12% to about 18% solvent, about 10% to about 15% emulsifier, about 10% to about 15% visually detectable coloring agent, and about 40% to about 50% polymer, such as water soluble polymer.

In another embodiment, the composition comprises about 1.2% to about 1.7% surfactant, about 1.0% to about 1.4% solvent, about 1.0% to about 1.4% emulsifier, about 1.0% to about 1.4%/weight visually detectable coloring agent, about 4.1% to about 5.8%/weight polymer (such as a water soluble polymer), and about 88.3% to about 91.7%/weight water. In still another embodiment, the composition comprises about 42% to about 48%/weight polyethylene glycol, about 28% to about 32%/weight sulfated ethoxylate alcohol, about 10% to about 15%/weight limonene, and about 10% to about 15%/weight carboxymethyl cellulose.

The compositions of the invention were found by the inventors to be readily adherent to a variety of different materials, including Teflon®, and to have high viscosity.

It is contemplated that the basic ingredients of the claimed compositions may be formulated together with a herbicide (e.g., Round Up®™) as a specific active ingredient, either alone or in combination with other active ingredients defined herein. The compositions may include a biocide, such as an insecticide or insect-repelling preparation. Alternatively, the composition may include a combination of a biocide and a surfactant alone as active ingredients, or a combination of a biocide, an insecticide, and a surfactant.

The present invention also provides for improved methods for monitoring and cleaning a surface. In some particular embodiments, the method employs the composition defined in Table 1 diluted 1:10 in water, wherein the active ingredient is a surfactant. In broadest application, the method comprises exposing a surface suspected of having a contaminating substance to a composition comprising a polymer, a visually detectable coloring agent and a surfactant, and removing the visually detectable agent from the surface. This method may be further described as including a step of wetting the surface, scrubbing areas of the surface that include the visually detectable coloring agent and rinsing the surface. Water may be used to both wet and rinse the surface being cleaned. The user will readily be able to detect areas that have not been thoroughly cleaned by presence of the coloring agent, and therefore may proceed to repeat the cleaning process where the coloring agent remains. The aforedescribed method in particular aspects may also employ any of the specific compositions herein described. In particular embodiments, the method employs a composition that includes a polymer, a visually detectable coloring agent, and a surfactant, combined with an extender, an emulsifier and a solvent.

The compositions are contemplated to be useful in a number of different applications. Because the compositions are adherent to a variety of surfaces, they may be utilized in cleaning a number of different types of potentially contaminated pieces of equipment and clothing items. The compositions adhere well to metal surfaces and to non-porous surfaces. By way of example, surfaces to which the described compositions adhere include butyl rubber, Bitcon™, PVC, knit or aluminized Nomex™, PBI, Kevlar, nitryl rubber, neoprene rubber, Saranex™, Tyvek™, fluoropolymers, and CPE fabric. These materials and others to which the composition adhere are further described as follows:

Challenge 5000, 5200, 5800, 6400, and X-21 are analog composite materials manufactured by ChemFab, Inc. They comprise an inner and outer layer of a Teflon analog between which is located a layer of fibrous material. The fibrous layer may be woven or non woven. The 5000 and 5200 products are fluoropolymer laminated onto both sides of a woven Nomex fabric. The 5800/6400 is fluoropolymer laminated on both sides of fibroglass fabric.

MIL-C-12189 and MIL-C-38149C are materials consisting of butyl rubber.

CPE is a material composed of a woven polyester fabric coated on both sides with a chlorinated polyethylene formulation.

PVC is a polyvinyl chloride formulation coated onto both sides of woven nylon fabric.

Responder is a plastic made of a polyethylene-based film laminated to both sides of a non-woven polypropylene fabric.

Butyl-coated nylon is an elastomer made of a butyl rubber meeting MIL-C-12189 coated onto both sides of woven nylon fabric.

Chlorobutyl coated Nomex is an elastomer made of chlorobutyl rubber coated to both sides of woven Nomex fabric.

Saran laminate is a plastic made of polyethylene/EVOH/polyethylene laminated on both sides of a nonwoven polypropylene scrim.

Trellchem VPS is an elastomer/plastic combination of neoprene coated onto both sides of woven polyester with a plastic film on the interior surface of a material.

X21 is a fluoropolymer (Teflon®) laminated to both sides of a fiberglass fabric.

By way of example and not limitation, the methods described are effective for the removal of soil, grease, blood, soot, or mixtures thereof, thoroughly and quickly from a surface. In particular aspects, the visually detectable agent of choice does not stain the surface being cleaned.

The compositions of the method may further include a biocide, so as to provide a technique for both cleaning and as an aid in assisting in the disinfection of a particular surface. Such would be particularly useful in a hospital setting. In other embodiments, the method may include the use of the aforedescribed composition that includes an insecticide. Such insecticide-containing cleaning compositions are expected to have particular application in the veterinary field, where a dual purpose of both cleaning and delousing may be accomplished. In still other embodiments of the method, the composition may include a herbicide. Such may be particularly useful in the agricultural industry.

The compositions of the present invention have particular application as decontamination and/or cleaning aids for chemical protection garments (encapsulating vapor protective suits, HAZ-MAT suits, splash suits, boots, turn-out gear, coats, etc.). In these applications of the composition, three objects of the invention are served:

The composition serves as a readily visible indicator under normal white light of the extent of mechanical brushing of the garment.

The composition functions as a detergent for the removal of polar and non polar materials from the surface of the garment.

The composition provides a visual indication of penetrations or physical breaches of the protective surface of the garment. This indication may be manifested as a detectable stain between the inner and outer barrier of the garment, or as a stain on the wearers undergarment.

Although in the embodiments of the invention described, the compositions are applied with a sprayer device which atomizes the composition and deposits it on the surface, other application methods are possible, such as (but not limited to) spreading, brushing and squirting. Likewise, other scrubbing methods can be employed, such as, but not limited to, brushing, sponging, and high pressure liquid stream.

As used in the description of the present invention, the term "contaminant" is defined as any unwanted substance or material, and includes, by way of example, dirt, sand, grease, blood, oils, ink, plant and animal debris, soot and the like. Decontamination as used in the description of the invention, is defined as the removal or safe neutralization of a contaminant from a surface.

The present invention also provides a cleaning kit. In one particular embodiment, the kit comprises a composition as described herein, including a surfactant and a visually detectable coloring agent, and optionally a brushing or scrubbing implement. In other embodiments, the kit will further include an insert sheet of instructions outlining the particular methods described herein for application of the composition and removal thereof.

BRIEF DESCRIPTION OF THE DRAWINGS

The following drawing forms part of the present specification and are included to further demonstrate certain aspects of the present invention. The invention may be better understood by reference to one or more of this drawing in combination with the detailed description of specific embodiments presented herein.

DETAILED DESCRIPTION OF THE PREFERRED EMBODIMENTS

Figure 1A:
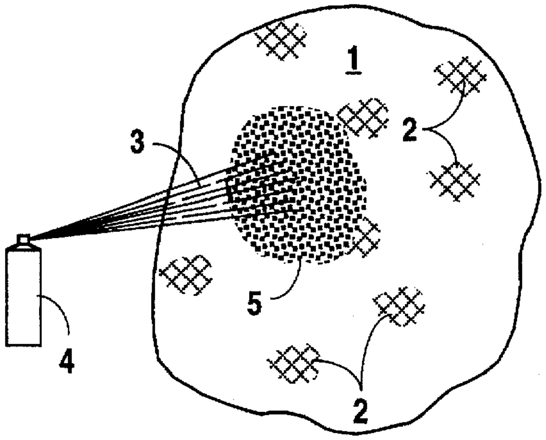
FIG. 1A, FIG. 1B, FIG. 1C, FIG. 1D, and FIG. 1E illustrate a particular series of steps for using the compositions in a cleaning and/or decontamination application.

The compositions and methods of the present invention provide a highly effective and unique approach to enhancing cleaning and/or decontamination procedures that rely on visual inspection. The compositions find utility as washing aids in the decontamination or cleaning of personnel, personal protective clothing, and equipment that may have been exposed to contaminating materials. Such contaminating materials include, but are not limited to: dirt, soot chemicals, radioactive materials, radioactive wastes, chemical warfare agents (such as mustard agents, VX, GA, GB, GD, H and HD agents), biological warfare agents, medical wastes, body fluids and the like.

In particular cleaning formulations, the composition comprises a visual disclosing coloring agent, such as a pigment or dye, in combination with surfactants and agents that give body and thickness to the mixture. When applied to a surface by spraying or other methods, the composition provides a visible indicator under standard white light that "clings", i.e., adheres, to the surface exposed. The readily visual coloring agent allows the worker to insure via immediate visual inspection portions of the surface that are covered with the cleaning agent and have not been cleaned. Likewise, disturbances on a treated surface that occur during scrubbing provide visual differentiation between scrubbed and unscrubbed areas. During rinsing, absence of the visible agent indicates that an area on which the cleaning or other active agent has been removed. In this manner, the thoroughness of the decontamination or cleaning procedure may be monitored.

Biocides that can be included in the compositions of the invention may be used to improve the methods by which disinfection procedures are conducted, specifically by indicating where a particular disinfectant has been applied. Such may find particular application, for example, in veterinary medicine, such as in monitoring the application of treatments for lice, mites, fleas, ticks, leaches, parasites, and the like.

Specific applications for the disclosed compositions include:

(a) cleaning and/or disinfecting environmental surfaces, (such as floors, walls, counter tops, and interior patient care areas, both stationary and in vehicles, and other surfaces not designed for intrusive contact with the patient or contact with body fluids);

(b) fire department equipment, such as trucks and other vehicles, hoses, SCBA's, axes, shovels, respirators, helmets, and hand held fire extinguishers;

(c) emergency vehicles, such as police cars, ambulances, and all types of disaster response equipment, on both interior and exterior surfaces;

(d) all types of military equipment, such as ships, submarines, tanks, aircraft, artillery, troop vehicles, weapons, hand tools, and field hospitals;

(e) food preparation, storage, packaging, and handling equipment, such as blanchers, conveyors, elevators, fillers, graders, slicers, sorters, washers, ovens, vats, mixers, coolers, freezers, refrigerators;

(f) hygiene facilities and equipment, such as locker rooms, lavatories, sinks, showers, urinals, bathtubs and laundry storage bins;

(g) hospital areas and equipment, such as operating areas, emergency rooms, patient rooms, bed frames, refuse containers, rooms;

(h) animal cages and quarters;

(i) car washes, for the thorough cleaning of cars, trucks, motorcycles, and other vehicles;

(j) factories, wherever manufacturing, assembly, or production processes require thorough cleaning of surfaces;

(k) cleaning and disinfecting applications that could occur in morgues, crematories, stockyards, cafeterias, restaurants, laboratories;

(l) de-icing aircraft and other equipment and surfaces; and (m) as an aid in training personnel in the procedure necessary to carry out any of the above applications. Simulant materials of various types can be applied and removed from a surface in clean-up (DECON) training exercises. This is particularly important in hazardous material cleanup training, where actual hazardous materials may not be used. For example, hazardous material cleanup responders spend much more time in decontamination exercises than in actual hazardous material spill incidents. The compositions of the present invention may be prepared containing an innocuous, non active substance in place of an expensive surfactant or biocide, and used in training. Personnel may be trained how to perform a thorough cleaning job with these less costly preparations of the invention in this manner.

Appropriately formulated, the described compositions may be applied directly to people, animals or plants, to rid the human/animal/plant of surface borne contaminants or disease agents. Also, agents such as medicines, fungicides, or pesticides could be added to the formulation in order to free the human/plant/animal of parasites or to treat skin conditions.

Some embodiments of the invention may include additives that make it very visible in normal white light (i.e., fluorescent, ultraviolet, or bright white). As a general characteristic, embodiments of the composition have a thick, sticky quality that makes it moderately hard to wash off. This is again, important in monitoring cleaning thoroughness. The compositions also have an enhanced wetting ability (low contact angle), a characteristic desirable in cleaning/decontaminating surfaces.

Figure 1B:
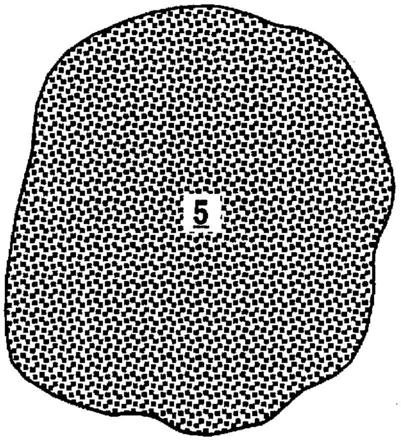
Figure 1C:
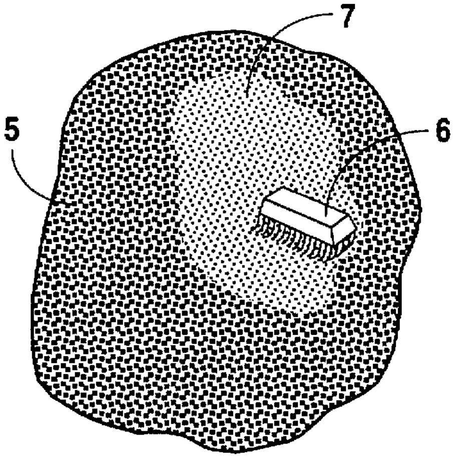
Figure 1D:
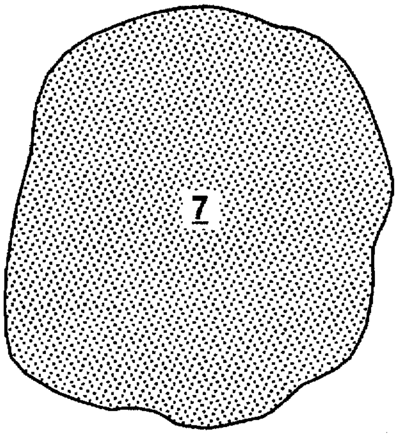
Figure 1E:
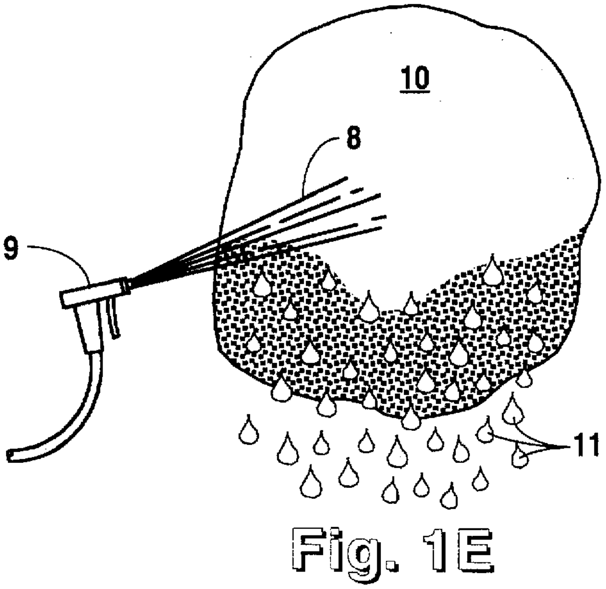

Referring now to the drawings wherein like reference numerals designate like or similar parts throughout the several views, there is illustrated in FIG. 1-A, by way of example, a surface 1, covered all or in parts by a contaminant 2 is covered with a coating of the composition by means of a sprayer 4 resulting in a visually detectable layer 5 of the cleaning agent. The colored composition on the surface can be visually inspected to insure that all portions of the surface have been covered (FIG. 1-B). The colored composition on the surface is scrubbed with a brush 6, which results in a coating of the colored composition with a disturbed appearance 7 (FIG. 1-C). The coating of the colored composition with a disturbed appearance can be visually inspected to insure that all portions of the surface 1 have been completely scrubbed (FIG. 1-D). A rinsing agent 8 is applied to the surface via a sprayer 9 to remove residual of the colored composition and contaminant 10, resulting in a clean surface 11 (FIG. 1-E).

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

Composition with Surfactant Preparation

The present example is provided to outline a particular concentrated form (10×) of the composition. While the present example outlines a 10× preparation, the ingredients may be doubled (to make a 20× concentrate) or cut in half (a 5× concentrate) or any other modification of specific component ingredients to form the composition of the invention. Alternatively, the presently described preparation may be used without further dilution for cleaning or and/or decontamination applications.

Five chemical components are utilized in one embodiment of the product concentrate. A description of these components, their functional class, their purpose, alternative classes, and possible ranges are provided in the following text.

COMPONENTS

SURFACTANT/EMULSIFIER

Some embodiments of the composition include at least one surfactant. Witcolate ES-370™ (Witco Chemical) is one surfactant that may be used. Witcolate belongs to a class of anionic surfactants known as sulfated ethoxylate alcohols. The ethoxylate portion of the molecule is composed of three repeating ethoxy units to which is linked an alkyl chain twelve to fourteen carbons in length. The ethoxylate portion of the molecule is sulfated. This product is purchased as the sodium salt in a paste form containing about 30% water by weight.

Other surfactants that solubilize non-polar contaminants that have low sudsing characteristics, low moisture content, water solubility, and biodegradability may also be used in the practice of the invention.

The concentration of the surfactant in some embodiments of the composition is about 15.38%/wt. The surfactant may be included in the compositions in amounts of about 0.1 to about 99%/wt. Water soluble surfactants of any class (anionic, cationic, nonionic, amphoteric) may be substituted for the Witcolate surfactant. By way of example, such surfactants include sulfonates, alkyl sulfates, sulfosuccinates, ethoxylated alcohols, alkanolamides, fatty acid esters, ethoxylated triglycerides, cocamido propyl betaines, imidozolines (e.g., nitro imidazoles), ethoxylated fatty amines, and the like. A general structure of the sorts of surfactants that may be used as part of the invention are shown.

$$R-(OCH_2CH_2)-OSO_3Na$$

wherein $R_1$=$C_5$–$C_{25}$, or in some embodiments, R=$C_{12}$ to $C_{14}$, and $R_2$=$SO_3Na$ or

SOLVENT

A particular solvent that may be used in some embodiments of the composition is limonene, and particularly d-limonene. This solvent is of the class of organic compounds known as terpenes. This solvent was obtained from SCM/Glidco as a re-distilled grade. The solvent is utilized in the product as a solubilizing agent for non-polar contaminants on a surface. This solvent was chosen for its excellent solvent characteristics, low toxicity, and biodegradability. This component is miscible in the liquid components of the composition concentrate. Upon the addition of water in some embodiments of the composition, this component forms a stable emulsion in the product through a synergistic association with the surfactant, viscosity builder, and concentrate extender.

The concentration of the solvent in one embodiment of the composition is about 12.82%/wt. The range for this component in the composition may be about 0.1 to about 90%/wt. A more particularly defined amount of the solvent to include is about 2 to about 25%/wt. Any grade of solvent may be substituted in the preparation of the composition. In addition, it is possible that a wide range of other organic solvents may be substituted for this solvent, including, but not limited to: aliphatic/aromatic hydrocarbons, alcohols, esters, ketones, aldehydes, amides, glycols, glycol ethers, halogenated derivatives of all classes, lactones, pyrolidinones, carboxylic acids, and the like.

EMULSIFIER

Some embodiments of the composition include an emulsifier. This component also serves as a viscosity builder. In one embodiment, the viscosity builder/emulsifier is the sodium salt of carboxymethylcellulose (CMC). CMC is a water soluble polymer. CMC was procured from Herculese/Aqualon as their product 99-7MXF. A grade of CMC that was used in one embodiment of the composition had a molecular weight of about 250,000 and a degree of substitution (carboxylate) of 0.65–0.90% (see structure).

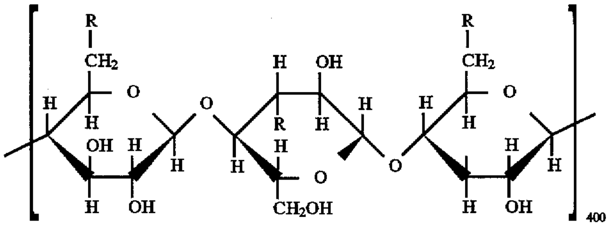

R=—$OCH_2COONa$, with degree of substitution= 0.65–0.90

When included in the composition, the emulsifier component is in suspension in the liquid components. In embodiments of the composition that include water or other suitable diluent, the emulsifier dissolves in the aqueous phase of the mixture. The viscosity of the composition increases to a high degree as a result. The viscosity of the composition allows it to wet low surface energy materials. By way of example, such low surface energy materials include polyethylene and Teflon® derivatives. Because Teflon® derivatives are used to fabricate chemical protective garments, the compositions are particularly useful in the cleaning and/or decontamination of these materials. In the composition without water or other diluent, viscosity is not as high, making the preparation convenient to measure and dispense. This characteristic of the composition without water or other diluent provides an embodiment that is particularly suitable commercial product, as the composition without water may be stored in relatively small shelf space until time of desired use.

The addition of water will increase further the adherent characteristics of the composition. This adherent character makes the composition particularly suitable for use as a visual means for monitoring the extent of brushing or cleaning of a surface, and as a penetrant of vertical or non-planar surfaces.

Any grade of CMC or other emulsifier may be utilized in the compositions. It is contemplated that emulsifiers having different molecular weights and degrees of substitution from that of CMC will be equally efficacious in the preparation of the present invention.

The amount of the emulsifier, such as CMC, in one embodiment of the composition is about 12.82%/wt. Depending on the grade utilized, the usable range of the emulsifier may be about 1.0% to about 80%/wt.

Other water soluble polymers may be utilized in this formulation as emulsifiers. In particular embodiments of the invention, the polymer should not be soluble in the composition as formulated without water (i.e., the particular solvents included), yet be soluble in water. Possible polymers include, but are not limited to: water soluble modified celluloses, plant gums of all descriptions, polyvinylpyrrolidone, polyvinylalcohol, polyethyleneoxide, alginates, pectins, gelatin, polyacrylamides, polyacrylic acids and its homologs, polyethylene glycols, polypropylene glycols, starches and derivatives.

VISUALLY DETECTABLE COLORING AGENT (PIGMENT/DYE)

All embodiments of the invention will include a visually detectable coloring agent. In some embodiments, the detectable coloring agent may comprise a colored pigment. Where the composition is to be used as a penetrant to identify breaches or defects in a surface, the composition would in some embodiments also include a fluorescent material, such as fluorescence.

By way of example and not limitation, a particular pigment used in the compositions is T-15 Blaze Orange™. This pigment was obtained from Day-Glo Color Corp (Austin, Tex.). This material is an orange pigment that has fluorescent characteristics in ultraviolet light (down conversion in short, medium, and long wavelengths). The form of the pigment used in some embodiments of the composition is a dry powder.

The pigment or other coloring agent of the composition need not be fluorescent to be useful in the practice of the present invention. As used in the description of the present invention, a pigment is a polymer particle to which a dye has been covalently bonded.

Pigments such as the one described above are available in a variety of colors, all of which can be substituted in this formulation. The pigment or other visually detectable coloring agent functions as a disclosing agent that is visible under normal white light, and aids in identifying the extent of mechanical scrubbing or brushing of a surface, such as that of a garment, or piece of equipment. In addition, pigments may be used that are detectable at very low concentrations in ultraviolet light. In such embodiments, use of the compositions will allow detection of protective barrier penetrations and surface defects that may entrain chemical contaminants.

In some embodiments, the amount of pigment, such as T-15 Blaze Orange™, in the composition is about 12.82%/wt. The range of coloring agent in the composition may be about 1 to about 90%/wt., or at a range of about 2% to about 25%/wt.

Pigment suspensions made in polypropylene glycol (PPG) as well as water dispersed preparations of the pigments were also evaluated. These pigment forms were less suitable in certain embodiments of the composition made without water or diluent. PPG preparations of pigment were found to be soluble in the solvent, d-limonene, thus forming a sticky mass upon the addition of water. Water dispersed pigments, dyes and other coloring agents in water also resulted in less convenient dispensable forms of the composition.

For best results, the inventors used dry powder preparations of the water dispersed pigment such as the dry powder of T-15 Blaze Orange™ pigment. Dry powdered forms of pigments and dyes are available in a wide range of colors, and are readily used in the practice of the invention.

Other pigments that may be substituted for T-15 Blaze Orange™ include, but are not limited to: synthetic organic pigments and dyes, plant and animal derived pigments (indigo, porphyrins, etc.) and dyes, inorganic pigments (carbon black, titanium dioxide, metal oxides, metal carbonate, metal sulfate), and dyes.

EXTENDER

By way of example, particular extenders useful in the invention are polymers and hydroxylated aliphatic alcohols. Polyethylene glycol (PEG) and polypropylene glycol (PPG) are examples of such polymers. PEG has an approximate molecular weight of about 200. This polymer, and other suitable polymers, are available in a variety of molecular weight ranges from a variety of sources. The PEG or other extender allows the viscosity of the composition to be manipulated to best facilitate ease in dispensing a desired volume, while maintaining suspension of the pigment and viscosity builder.

The concentration of the extender component in one embodiment of the composition is about 46.15%/wt. The amount of this component in the composition may range from about 20 to about 95%/wt. It is possible for any number of water soluble solvents or water soluble liquid polymers to be utilized in place of the PEG. These may include, but are not limited to: polypropylene glycol, glycol ethers, n-methyl pyrolidinone, glycerol, ethylene glycol, butane diol, hexane diol, hexane triol, or mixtures thereof. Examples of the hydroxylated aliphatic alcohols include glycerol, ethylene glycol, butane diol, hexane diol and hexane triol, to name a few.

DILUENT (WATER)

A diluent, such as water or other solution, may also comprise a component of some embodiments of the composition. Where included, the diluent may comprise from about 0.1%/wt to about 99%/wt of the composition. In other embodiments, the diluent comprises from about 50%/wt to about 95%/wt of the composition, while in other embodiments, the diluent comprises between 75%/wt to about 95%/wt of the composition. In one particular embodiment, the composition comprises about 85%/wt to about 95%/wt water or other diluent. The composition including about 92%/wt diluent, particularly water, has been found by the inventors to be particularly preferred and to have especially desirable adherent characteristics to hard-to-wet surfaces, such as Teflon®.

In a particular embodiment, the composition of the invention (without water) was prepared containing the following constituents:

TABLE 1

CLEANING/DECONTAMINATING FORMULATION

| Component | Manufacturer | Weight Percent |
|---|---|---|
| 1. Polyethylene Glycol (200 MW) | BASF | 46.15% |

TABLE 1-continued

CLEANING/DECONTAMINATING FORMULATION

| Component | Manufacturer | Weight Percent |
|---|---|---|
| 2. Ethoxylate Alcohol (sulfated) (Witcolate ES-370 ™ ) | Witco Chemicals | 15.38% |
| 3. d-Limonene | SCM/Glidco | 12.82% |
| 4. T-15 Blaze Orange ™ | Day-Glo Color Corp. | 12.82% |
| 5. Carboxymethyl Cellulose (Sodium) (#7MXF) | Herculese/Aqualon | +12.82% |
| | | 99.99% |

The described formulation was also prepared with nonyl phenol ethoxylate (a non-ionic surfactant, Tergitol®, Union Carbide) in place of the anionic surfactant, ethoxylate alcohol (sulfated) (See Example 8).

EXAMPLE 2

Preparation of Ready-To-Use Adherent Composition

The present example is provided to outline the method by which a water containing composition of the invention may be formulated from those embodiments of the composition that do not include water, as well as a method for preparing the composition with water or other diluent as an initial composition. Both preparations include an amount of water found to provide compositions with particularly desirable adherent characteristics and ease of use and application to Teflon®-treated surfaces and protective garments.

FROM COMPOSITION FORMULATED WITHOUT DILUENT (WATER):

For use in cleaning applications or decontaminating applications, some embodiments of the composition include one part of the composition described in Table 1, or equivalent solvents, pigment/dyes, extenders, surfactants, or emulsifiers, combined with nine parts water. This composition is then mixed thoroughly before use. It is also expected that mixtures that include 0.1, 0.2, 0.3, 0.4, 0.5 to 0.9 parts, 01 1 to 9 parts water or other diluent together with one part of the composition as prepared without water (or other diluent) will also provide the described decontamination or cleaning preparation.

COMPOSITIONS CONTAINING WATER OR OTHER DILUENT:

In some embodiments, the composition may also be prepared to include water or other suitable diluent as an initial preparation. In such embodiments, polyethylene glycol or other extender is not a required component, but may be included as an optional component.

By way of example, such embodiments would comprise a suspension of the following components:

- about 1% to about 5%/wt Witcolate ES-370™ (or other surfactant) (particularly 1.2 to 1.7%/wt);
- about 1% to about 2%/wt limonene (such as d-limonene) (or other solvent) (particularly 1.0 to 1.4%/wt);
- about 1% to about 5%/wt T-15 Blaze Orange™ pigment (or other pigment, dye or visually detectable coloring agent) (particularly 1.0 to 1.4%/wt);
- about 1% to about 10% carboxymethyl cellulose (or other polymer) (particularly 1.0 to 1.4%/wt);
- about 78 to about 96%/wt water (or other carrier solution) (particularly 88.3 to 91.7%/wt); and
- about 2.0% to about 10%/wt extender (such as PEG or PPG) (particularly 4.1 to 5.8%/wt).

Other carrier solutions that may be employed in the practice of the invention include alcohols, ketones, and the like. It is expected that the compositions of the invention in forms with or without the diluent (e.g., water), will be shelf-stable for periods of 1 year or longer.

STRIPPABLE FILM COMPOSITION:

In other contemplated applications, the carrier solution may comprise a volatile solvent, such as alcohol. In use, the preparation would be allowed to dry on the object treated, and then brushed, scrubbed, or peeled off the surface. The compositions formulated to provide a tough film that is peeled off a surface also include a plasticizer. In any contamination on a surface would be peeled off like a film. No additional liquid is required to remove the formed film from a surface in this application.

In simplest form, the strippable coating is to be formulated as a pigmented lacquer. This laquer will include a volatile carrier solvent in which is dissolved a polymer matrix, a plasticization agent, a solvent for the contaminating agent, and a pigment. The solvent carrier may take the form of a mixture of solvents of varying volatility. A graded series of boiling points are frequently necessary to promote film formation. These solvents will have to be selected with respect to the types of materials on which they are going to be applied in order to avoid damaging the surface being cleaned. The solvents should have a low human toxicity and be environmentally acceptable. By example, the solvent system may contain the following solvents: terpenes, alcohols, esters, pyrolidones, and lactones. A polymer matrix will be selected which will be soluble in the acceptable solvents. This polymer should be capable of forming tough, durable films. A variety of polymeric materials may be suitable for this purpose. Some examples of these polymers are: modified cellulosic polymers, acrylic polymers, styrene and copolymers, vinyl polymers and acetates, as well as other classes of elastomeric polymers.

It is possible that a polymer blend will be utilized in the formulation to achieve the desired film characteristics. In order to achieve a film which is flexible and removable (non adherent), it will be necessary to utilize plasticizers in the polymer film. Generally, these compounds are oily liquids with a high boiling point, although waxy solids are sometimes employed. These compounds are generally non polar in nature and may function to solubilize contaminating agents, including those hardened by being dissolved in a polymer. Some examples of these compounds are esters of phthalic acid, esters of benzoic acid, aliphatic hydrocarbons, esters of citric acid. It may be necessary to include additional high boiling components to assure dissolution of the contaminating agent. Finally, the pigment will be incorporated into the composition. The pigment provides a visual indication of the presence of the film on the surface being cleaned. Additionally, the pigment serves as a film extender, or bulking agent. This will be necessary to facilitate the removal of the film from the surface being cleaned.

A second approach to the concept of a strippable film is the utilization of a coating which is formulated as a latex, or emulsion. Coatings of this type employ an aqueous continuous phase with a polymer dissolved in a solvent as the discontinuous phase. Surfactants and stabilizers in the continuous phase promote emulsion formation and stability. The pigment is dispersed in the continuous phase independently of the discontinuous phase. Upon application to the surface to be cleaned, the continuous phase begins to evaporate causing the droplets of the discontinuous phase and pigment to coalesce, forming a film of relatively high initial viscosity. The solvent in the film is next eliminated through evaporation, forming a continuous solid surface film which can be peeled from the surface. All of the active ingredients utilized in the previously mentioned lacquer formulation would be dispersed in the discontinuous phase with the pigment being dispersed in the continuous phase. The advantages of an emulsion are reduced levels of volatile solvents, ease of application (lower viscosity formulation), and ease of cleaning application equipment.

EXAMPLE 3

Method of Using Visually Detectable Disclosing Composition

The present example is provided to demonstrate one particular embodiment of the presently disclosed composition and one preferred method by which it is to be made.

The composition of Table 1 provides an orange-colored concentrate embodiment of the composition which is mixed with water or other diluent in a ratio of 1:10 (concentrate:water) to form a suspension. The resulting suspension was applied to a surface by spraying, such as with a pneumatic or electric sprayer. Alternatively, the composition may be applied by manual means. The surface is next brushed to loosen and suspend any surface contaminants present. After brushing, the surface is to be inspected for evidence of incomplete brushing by visually looking for areas where the colored compositions remain undisturbed. Upon complete brushing and inspection of the surface, the surface is rinsed with a liquid, such as a stream of clean water. The surface may then be inspected for evidence of incomplete removal of the coloring agent. This may be accomplished by visually examining the surface under normal white light for the presence of the visually detectable coloring agent. The process may be determined to be complete when no further visible sign of the coloring agent remains. The device or garment that is so processed may then be easily inspected for signs of any surface area that has not been scrubbed as well as for defects in the surface (e.g., for garments seam failure, barrier perforation, etc.) where signs of the coloring agent may be detected.

EXAMPLE 4

Stability Study

The present example demonstrates the shelf stability of the concentrated compositions that do not include water or other diluent.

The composition examined in the present example was prepared according to Table 1. The composition was then stored at room temperature for 90 days. At the end of that period, water was added to the composition in a ratio of 1:10 (1 part composition, 9 parts water).

The initial (no water) composition was examined for viscosity to determine if it readily poured from its container and was susceptible to accurate measuring. This composition was determined to have a viscosity amenable to easy measurement. The composition was then mixed with water (1:10). This composition was found to adhere well to surfaces of protective garments (Teflon®-like surfaces). The inventors conclude that the compositions are shelf-stable over an extended period of time without any significant loss of adherent capacity when mixed with a diluent.

EXAMPLE 5

Whole Suit Timed Spray Tests I

The present example demonstrates the utility of the compositions for adhering to a surface and providing a surfactant in an adherent form on a surface. This example also illustrates a visually detectable technique for monitoring areas of contact by visual detection under white light.

The composition used in this example was prepared as defined in Table 1, diluted 1:10 in water, and then applied to a suit of chemical protective clothing using a Wagner® electric sprayer, Model 404. The following summarizes the results of these tests.

The composition was applied to an inflated Lifeguard, Inc. Responder™ Class A fully encapsulating vapor protective suit. Elapsed times were recorded for coating the suit with the composition, for scrubbing the whole suit, and for rinsing all the residue.

Table 2 outlines particular apparatus used in applying the above described composition to a surface here, the surface of a chemical protective suit (Responder® material). The times indicated identify the time at which each step was determined to be completed, visually judged under white light for the presence/absence of the visually detectable coloring agent used.

The test demonstrated that the application method could be carried out in the field in a reasonable period of time, with the composition at a 1:10 dilution performing well as a disclosing agent.

TABLE 2

| | TEST 1 | TEST 2 | TEST 3 |
|---|---|---|---|
| Sprayer | Wagner ® Electric Model 404 | Wagner ® Electric Model 404 | Goldblatt Pace Setter ® Air Sprayer (80 PSI) |
| Spray Time (Full Suite Coverage) | 1 min. 52 sec. | 1 min. 40 sec. | 1 min. 17 sec. |
| Scrub Time | 1 min. 30 sec. | 2 min. 0. sec. | 2 min. 3 sec. |
| Rinse Time | 1 min. 50 sec. | 1 min. 18 sec. | 1 min. 29 sec. |
| Total Elapsed Time | 5 min. 12 sec. | 4 min. 58 sec. | 4 min. 49 sec. |
| Amount of Composition (1:10 dil.) Used | 1000 cc | 1000 cc | 1800 cc |
| Water Flow In Brush? | No | Yes | Yes |
| Average Height of Water in Tub After Rinse | 1" | ½" | 1" |
| Total Water Used (Scrub and Rinse) | 28 gallons | 14 gallons | 28 gallons |

EXAMPLE 6

Whole Suit Timed Spray Tests II

The present example was conducted using the composition of Table 1 diluted 1:10 with water.

Table 3 outlines the particular spray devices used, as well as some specific spray, scrub and rinse times found to be useful in actual trials with the compositions to process whole protective suits. The procedure used was essentially as described in Example 5. The results presented in Table 3 demonstrate the utility of the compositions as an aid in cleaning and/or decontamination applications.

TABLE 3

| | Trial Test | Test 1 | Test 2 | Test 3 | Test 4 |
|---|---|---|---|---|---|
| Sprayer | Goldbaltt ® Pace Setter Air Sprayer | Gold-blatt ® Pace Setter Air Sprayer | Gold-blatt ® Pace Setter Air Sprayer | Gold-blatt ® Pace Setter Air Sprayer | Gold-blatt ® Pace Setter Air Sprayer |
| Spray Time (Full Suit Coverage) | 1 min, 57 sec | 1 min, 20 sec | 0 min, 53 sec | 1 min, 7 sec | 1 min, 11 sec |
| Scrub Time | 1 min, 46 sec | 1 min, 36 sec | 1 min, 16 sec | 1 min, 25 sec | 1 min, 21 sec |
| Rinse Time | 1 min, 11 sec | 0 min, 48 sec | 1 min, 2 sec | 1 min, 13 sec | 0 min, 58 sec |
| Total Elapsed Time | 3 min, 54 sec | 3 min, 44 sec | 3 min, 15 sec | 3 min, 45 sec | 3 min, 10 sec |
| Amount of composition (1:10 in water) Used (in cc) (Start/Finish) | 1000/1700 (More Composition Added During Test) | 2000/ 1400 | 2000/ 1000 | 2000/ 1200 | 1650/ 950 |
| Water Flow In Bruse? | Yes | Yes | Yes | Yes | Yes |
| Average Height of Water in Tub After Rinse | 1" | 1" | ¾" | 1" | 1" |
| Total Water Used (Scrub and Rinse) | 28 gal. | 28 gal. | 21 gal. | 28 gal. | 28 gal. |

Materials and Methods

Test 1

Responder™ Class A protective suit, Model #50451, Serial #61807. Date manufactured May 25, 1993. Size—Large. Manufacturer—Lifeguard. NFPA 1991. Non-slippery as washed off compositions from treated garment.

Text 2

Same suit as in Test 1, plus Silver Flash Suit worn over the protective suit. Flashmax™ #3, by Chemron, Inc., Order #56958. Aluminized oversuit/flash-fire cover suit.

Test 3/Test 4

Lifeguard Responder Class B suit, Model #80470, Serial #44651.

Results:

Foot wet after test 3—possible leak. Slight orange color on socks.

These results demonstrate the utility of the compositions as an aid in cleaning and/or decontamination applications.

EXAMPLE 7

Compositions in Protective Clothing Processing

Some embodiments of the invention provide methods for enhancing washing effectiveness of a surface by providing a visually detectable marker. Such methods find particular application in methods for decontaminating personal protective clothing. Hazardous spill response is a particular unique and useful application of the technology, and serves to provide a more easily detectable system for monitoring the thorough cleaning of protective clothing.

For this application, the composition of Table 1 was diluted 1:10 in water. The steps that were followed are defined in Table 4.

TABLE 4

| Step |
|---|
| 1. Apply the composition (an electric sprayer is used in this case) |
| 2. Inspect the surface to assure that it is completely covered |
| 3. Scrub the surface to clean it. The visual signature of the compositon makes it possible to tell scrubbed areas from untouched ones. A brush/handle system that supplies a small, continuous flow of water to the brush is being used to scrub in the photograph. |
| 4. Inspect the surface to make sure all of the surface has been scrubbed. |
| 5. Rinse the surface to remove composition and residual contaminants. The brush/handle combination is again used in this example, with the water flow turned to high. |

As a last step, the method included inspecting the surface to determine if all traces of the colored composition had been removed.

These steps embody the best mode contemplated by the inventors for processing protective clothing and other surfaces.

EXAMPLE 8

Formula with Non-Ionic Surfactants

The present example is provided to demonstrate the utility of the compositions claimed with non-ionic surfactants. The particular non-ionic surfactant used in the example is nonylphenol ethoxylate.

The specific ranges of PEG, d-limonene, T-15 Blaze Orange™ and CMC defined in Table 1 were used in this formulation. The amount of nonyl-phenol ethoxylate used was 15.38%/wt and the Witcolate ES-370™ (sulfated ethoxylate alcohol) was not included. The formulation was diluted 1:10 in water. Activity of the composition for adhering to a surface of Teflon® poly (tetrafluoroethylene) (PTFE) and a polyethylene laminate, and cleaning ability (waxy contaminant (grease pencil)) were assessed. The waxy contaminant was easily removable upon application of the composition with minimal scrubbing or rubbing.

EXAMPLE 9

Cleaning Efficacy

On a side by side comparison with common dish washing solution (DAWN®, 3 ounces diluted in 1 gallon water as currently used in the art), the described composition of the present invention (Table 1 composition diluted 1:10 in water) removed a waxy grease contaminant from a Teflon® surface, while the dish-washing solution provided only partial removal after extended scrubbing/rubbing.

A combination of non-ionic and anionic surfactants in the composition would also be expected to provide useful cleaning preparations of the invention. In a specific combination, about 7.0%/wt of a non-ionic surfactant, such as the nonyl-phenol ethoxylate of example 8, and about 7.0%/wt Witcolate (anionic surfactant) of may be included in the composition.

Mixtures of surfactants, as well as blends of surfactants available to those of skill in the art from commercial sources, may also be used in the practice of the invention. These preparations are also expected to provide effective cleaning and/or decontaminating preparations.

The present invention also provides a method for enhancing the adherence and visibility of a cleaning agent on a surface. In one embodiment, this method comprises combining a cleaning agent (i.e., surfactant) with a visually detectable coloring agent (as described herein) and a polymer, a hydroxylated aliphatic alcohol, or a mixture thereof. For example, a cleaning agent could be mixed with a pigment and, as the polymer, polyethylene glycol and/or glycol. These and other combinations are contemplated in the present invention.

EXAMPLE 10

Viscosity

The present example provides viscosity measurements of the claimed compositions. Viscosity is expressed in centipoise units, as recognized by those of skill in the art. Relative viscosity of a compound provides an objective parameter from which the adherent character of the preparation may be judged and compared to others. The adherent nature of the claimed compositions is an important characteristic not provided in cleaning and/or decontamination techniques used to date. This characteristic also makes the compositions particularly efficacious in the cleaning of vertical and non-planar surfaces.

The present example also provides comparative data on the viscosity of the claimed compositions and the viscosity of compositions used in the art for cleaning and/or decontamination.

The viscosities were determined using a Brookfield spinning disk viscometer. The specific method utilized in the determination of viscosity was drawn from the instructional information provided by the manufacturer of the viscometer: Brookfield Engineering Laboratory.

TABLE 5

| | Dilution | Viscosity (centipoise) |
|---|---|---|
| Composition | 0 | 196 |
| | 1:10 (in water) | 1400 |
| Dishwashing detergent | 0 | 296 |
| (Dawn ®) | 3 oz./1 gal. water | 14.8 |
| Winsol ® | 0 | 16.4 |
| | 3 oz./1 gal. water | 16.3 |

The viscosity of the diluted form (1:10, water) of the composition of Table 1 was found to be 1400 centipoise. The viscosity of the dishwashing detergent/water at a dilution currently used for decontaminating a surface was much lower, only 14.8 centipoise.

Surface Tension Measurements

Surface tension measurements will be made during optimization of the product. A modified version of American Society for Testing and Materials (ASTM) standardized test D724-89, Standard Test Method for Surface Wetability of Paper (Angle-of-Contact Method) will be used to determine surface tension.

Some embodiments of the compositions of the invention having suitable adherent character are further described as having a viscosity of from about 500 centipoise to about 3500 centipoise. In other embodiments, viscosity range may be about 1000 to about 3000 centipoise. In some embodiments, viscosity is about 1000 to about 2000 centipoise, or even more particularly about 1200 to about 1500 centipoise.

PROPHETIC EXAMPLE 11

Combination of Compositions with other Pharmacologically Active and/or Indicator Molecules The present example outlines several combinations of the compositions of the invention together with other pharmacologically active components. The following list provides examples of some of these components that may be included in the formulation either individually or collectively for agricultural, veterinary, industrial, and diagnostic applications.

Herbicides (e.g., Round-Up™);
Pesticides (e.g., pyrethrins);
Biocides (e.g., iodine/polyvinyl pyrrolidone complex);
Fertilizers (e.g., ammonium nitrate);
Radio isotopes;
medicines (e.g., antibiotics, steroids, aspirin, etc.); and
Fluorescent materials.

These, and many other agents may be combined with the basic composition formulation of the invention in an amount appropriate for the particular application intended by the artisan of ordinary skill.

The following references, to the extent that they provide exemplary procedural or other details supplementary to those set forth herein, are specifically incorporated herein by reference.

REFERENCES

1. "Evaluating the Effectiveness of Haz-Mat Decontamination", David F. Peterson, Fire Engineering, April, 1994.
2. "Personal Protective Equipment Decontamination for Hazardous Waste Operations and Emergency Response", S. Z. Mansdorf, *Performance of Protective Clothing: Fourth Volume, ASTM STP* 1133, James P. McBriarty and Norman W. Henry, Eds., American Society for Testing and Materials, Philadelphia, 1992.
3. "Standard Operating Safety Guides", Environmental Response Branch, Hazardous Response Support Division, Office of Emergency and Remedial Response, U.S. Environmental Protection Agency, November, 1984.
4. "Haz-Mat Protective Clothing Decontamination Cleaner for Cleaning Has-Mat Suites"™, an advertising brochure distributed by Winsol laboratories, Inc., 1993. (Address: Winsol laboratories, Inc., 1417 NW 51st Street, Seattle, Wash., 98107 (800) 782-5501)
5. "IDO Disinfectant™, Cleaner Disinfectant Sanitizer Winsol Laboratories, Inc. 1993.

What is claimed is:

1. A composition comprising:
(a) about 1% to about 90%/weight of a surfactant consisting essentially of sulfated ethoxylate alcohol or nonyl-phenol ethoxylate;
(b) about 0.1% to about 90%/weight of a solvent consisting essentially of a terpene;
(c) about 1% to about 80%/weight of a viscosity builder/emulsifier selected from the group consisting of carboxymethylcellulose, plant gum, polyvinylpyrrolidone, polyvinyl alcohol, alginates, pectin, gelatin, polyacrylamide, and polyacrylic acid liquid;
(d) about 0.1% to about 90%/wt of a colored pigment; and
(e) about 20% to about 95%/wt of a compound that is a liquid at room temperature selected from the group consisting of polyethylene glycol, polypropylene glycol, a glycol ester, and n-methyl pyrrolidine, wherein the composition retains the original pigment color upon application to a surface.

2. The composition of claim 1 wherein the terpene is limonene.

3. The composition of claim 1 wherein the colored pigment is a synthetic pigment, an inorganic pigment, an organic pigment or a plant-based pigment.

4. The composition of claim 1 further defined as comprising:

(a) about 5% to about 25% of surfactant consisting essentially of sulfated ethoxylate alcohol;

(b) about 2% to about 25% solvent consisting essentially of a terpene;

(c) about 2% to about 25% viscosity builder/emulsifier consisting essentially of carboxymethylcellulose;

(d) about 2% to about 25% of the colored pigment;

(e) about 30% to about 70% polymer consisting essentially of polyethylene glycol.

5. A composition comprising:

(a) about 18% to about 22%/w sulfated ethoxylate alcohol;

(b) about 12% to about 18%/w limonene;

(c) about 10% to about 15%/w carboxymethylcellulose;

(d) about 10% to about 15%/w organic colored pigment; and (e) about 40% to about 50%/w liquid polyethylene glycol.

6. A composition comprising:

(a) about 1.2% to about 1.7%/w sulfated ethoxylate alcohol;

(b) about 1.0% to about 1.4%/w limonene;

(c) about 1.0% to about 1.4%/w carboxymethylcellulose;

(d) about 1.0% to about 1.4%/w organic colored pigment; and (e) about 4.1% to about 5.8%/w liquid polyethylene glycol.

7. A composition comprising;

(a) about 42% to about 48%/wt liquid polyethylene glycol;

(b) about 28% to about 32%/wt sulfated ethoxylate alcohol;

(c) about 10% to about 15%/wt pigment;

(d) about 10% to about 15%/wt limonene; and (e) about 10% to about 15%/wt carboxymethylcellulose.

8. A composition comprising;

(a) about 1% to about 5%/wt sulfated ethoxylate alcohol;

(b) about 1% to about 2%/wt limonene;

(c) about 1% to about 5%/wt colored pigment;

(d) about 2.0% to about 10%/wt carboxymethyl cellulose; and (e) about 78% to about 95%/wt water.

9. The composition of claim 8 comprising about 90%/wt water.

10. A method for cleaning a surface comprising:

(a) applying to a surface suspected of having a contaminating substance the composition of claim 7 or 8; and (b) removing the composition from the surface.

11. The method of claim 10 wherein step (b) comprises wetting the surface, scrubbing areas of the surface that include the composition and rinsing.

12. The method of claim 10 further comprising a step (c) comprising examining the surface for residual composition and removing residual visually detectable coloring agent from the surface.

13. The method of claim 10 wherein the surface is metal.

14. The method of claim 10 wherein the contaminating substance is soil, grease, blood, soot, or a mixture thereof.

15. The method of claim 10 wherein the composition further comprises an insecticide, a herbicide, or a mixture thereof.

16. A cleaning kit comprising:

a composition as defined in claim 7 or 8.

* * * * *

UNITED STATES PATENT AND TRADEMARK OFFICE

CERTIFICATE OF CORRECTION

PATENT NO. : 5,670,469

DATED : September 23, 1997

INVENTOR(S) : Dingus et al.

It is certified that error appears in the above-identified patent and that said Letters Patent is hereby corrected as shown below:

Column 4, line 10, please replace "constituting" with --constitutes--.
Column 11, line 20, please replace "polyvinylpyrrolidone" with --polyvinylpyrrolidone--.
Column 17, Table 3, line 5, please replace "Goldbaltt®" with --Goldblatt®--.
Column 20, claim 1, line 49, please delete "a";
line 50, please insert --an-- after "builder/";
line 55, please delete "liquid"; and
line 57, please delete the second "a".
Column 21, claim 4, line 10, please insert --and-- after "pigment"; and
line 12, please insert --liquid-- before "polyethylene".
Column 22, claim 8, line 9, please delete "(d)"; and
please insert --polyethylene glycol; (d) about 1% to about 10%/wt-- before "carboxymethyl".
Claim 12, line 25, please replace "visually detectable coloring agent" with --composition--.

Signed and Sealed this

Thirtieth Day of December, 1997

Attest:

BRUCE LEHMAN

Attesting Officer

*Commissioner of Patents and Trademarks*